(12) United States Patent
Factor et al.

(10) Patent No.: US 9,697,224 B1
(45) Date of Patent: Jul. 4, 2017

(54) DATA DEDUPLICATION FOR AN EVENTUALLY CONSISTENT SYSTEM

(71) Applicant: International Business Machines Corporation, Armonk, NY (US)

(72) Inventors: Michael E. Factor, Haifa (IL); Elliot K. Kolodner, Haifa (IL); Gil Vernik, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 15/019,066

(22) Filed: Feb. 9, 2016

(51) Int. Cl.
*G06F 17/30* (2006.01)

(52) U.S. Cl.
CPC .. *G06F 17/30156* (2013.01); *G06F 17/30117* (2013.01)

(58) Field of Classification Search
CPC ............. G06F 11/1453; G06F 11/1456; G06F 15/173; G06F 15/17331; G06F 17/30; G06F 17/30002; G06F 17/3015; G06F 17/30159; G06F 17/30303; G06F 2003/0692; G06F 3/0608; G06F 3/0619; G06F 3/0641; G06F 3/0665; G06F 3/0673
See application file for complete search history.

(56) References Cited

U.S. PATENT DOCUMENTS

| | | | |
|---|---|---|---|
| 8,224,875 B1 | 7/2012 | Christiaens et al. | |
| 8,660,997 B2 | 2/2014 | Factor et al. | |
| 8,706,703 B2 | 4/2014 | Factor et al. | |
| 8,775,390 B2 | 7/2014 | Anglin et al. | |
| 8,819,208 B2 | 8/2014 | Wright | |
| 8,996,467 B2 | 3/2015 | Apte et al. | |
| 9,020,900 B2 | 4/2015 | Vijayan Retnamma et al. | |
| 2008/0098083 A1* | 4/2008 | Shergill ............ G06F 17/30303 709/217 |

(Continued)

OTHER PUBLICATIONS

Strzelczak, et al., "Concurrent Deletion in a Distributed Content-Addressable Storage System With Global Deduplication." Fast '13: 11th USENIX Conference on File and Storage Technologies (Jun. 2013); https://www.usenix.org/system/files/login/articles/20_fast13_online.pdf; (14 pgs).

*Primary Examiner* — Taelor Kim
(74) *Attorney, Agent, or Firm* — Cantor Colburn LLP; David Quinn

(57) ABSTRACT

Aspects of the present invention include a method, system and computer program product for performing data deduplication for eventually consistent distributed data storage (DDS) system. The method includes receiving data content from one or more clients by a DDS system, wherein the one or more clients do not coordinate transmitting of the data content. The method also includes calculating a hash for the data content by the distributed data storage system, writing the data content to an object used for data deduplication, wherein a name of the object is based on the hash and determining whether the data content is present in the distributed data storage system based on the name of an object previously stored on the DDS system. The method further includes keeping track of a number of references to the data content and delaying deletion of the data content for a predetermined period of time.

14 Claims, 5 Drawing Sheets

(56) References Cited

U.S. PATENT DOCUMENTS

| | | | |
|---|---|---|---|
| 2010/0036831 A1* | 2/2010 | Vemuri | G06F 17/30516 707/707 |
| 2011/0191305 A1* | 8/2011 | Nakamura | G06F 3/0608 707/692 |
| 2013/0036289 A1* | 2/2013 | Welnicki | G06F 3/0608 711/173 |

* cited by examiner

DATA DEDUPLICATION FOR AN EVENTUALLY CONSISTENT SYSTEM

BACKGROUND

The present invention relates to distributed data storage systems, and more specifically to a method, system and computer program product for performing data deduplication for an eventually consistent distributed data storage system, where clients can read, write and delete data without any coordination between them, and the implementation is lock-free. Without loss of generality we explain our method for a distributed object storage system; it also applies to other distributed systems, e.g., for block and file storage.

Methods and systems exist for data deduplication in a distributed data storage system. Such a distributed data storage system typically comprises a plurality of data storage devices such as, e.g., servers with direct attached storage (e.g., disks), connected together in some type of network and could be located in a cloud. Such a system also commonly maintains multiple copies (replicas) of its data on a plurality of the servers (e.g., redundant data) so as to make the data more durable and less likely to be lost in the event of failure. Without loss of generality these copies could be erasure coded.

When a new version of an object is written and stored in a distributed storage system, it needs to be propagated to all of its replicas. Furthermore, there may also be storage metadata that needs to be propagated and/or updated. However, this propagation takes time and does not occur instantaneously. Thus, there may be a period of time (albeit usually relatively small) in which one or more replicas will have the new data while the other replicas may not be created or hold an older or previous version of the data. Thus, two clients that read the object at the same time may not see the same value. Eventually, the data will propagate to all of the replicas within the distributed data storage system such that the replicas will be consistent (hence, the term "eventually consistent"). The motivation for building such eventually consistent storage systems is the CAP theorem, which states that it is impossible for a distributed computer system to simultaneously provide all three of the following guarantees: consistency (all nodes see the same data at the same time), availability (a guarantee that every request receives a response about whether it succeeded or failed), and partition tolerance (the system continues to operate despite arbitrary partitioning due to network failures).

Data deduplication generally refers to a method that reduces the amount of data storage space needed to store data. Various methods of data deduplication exist. For example, different storage objects may contain identical content. Storing this duplicate data separately for each object is inefficient as it results in an excess amount of data storage space being utilized to store the same content.

Instead, data deduplication stores a piece of content once. Typically data deduplication employs a cryptographic hash function to identify duplicate content (with extremely high probability two pieces of content have the same hash only if they are identical) and maintains a dictionary of the content that has already been stored. When new data is written, the hash of its content is checked against the dictionary to see if the content is new. If new, a new content entity is created and a new entry is made for it in the dictionary. If a duplicate, an indication is made (e.g., a reference count increased), and a pointer or some other identifier is used to reference that content. The data deduplication method typically may take place on an object level, on the file level or on a finer grain data block level. The data pointer or other identifier usually takes up far less storage space than the piece of data itself. As a result, use of a data deduplication method can result in the saving of a relatively large amount of data storage space in a distributed data storage system. For example, consider a storage system for email attachments. In a deduplicated system, the content of a particular attachment might be stored once as (with appropriate redundancy for that content object), rather than once for each time it was sent in an email. The calculation of the hash and/or the detection of duplication may occur on the client side or in the storage system itself.

Sometimes it may be desired to delete a piece of data that has been previously deduplicated within a distributed data storage system, for example when that piece of data is no longer being referenced by any client. However, a potential issue with the deletion of deduplicated data within an eventually consistent distributed data storage system is that a race condition may occur in which it appears that no client is attempting to reference a particular piece of data while the system is in the process of deleting that particular piece of deduplicated data. However, in reality a client is indeed simultaneously in the process of attempting to reference that particular piece of data. That is, two conflicting operations are being attempted to be carried out at the same time on the particular piece of data (i.e., both the deletion of that data and access to that data). As a result, that particular piece of deduplicated data cannot be safely deleted from the distributed data storage system.

What is needed is an eventually consistent distributed data storage system that utilizes a data deduplication method, which allows for the safe deletion of deduplicated data. It is also desirable to allow for the avoidance of sending data content over the network ("over-the-wire") into the system when that data content already exists in the distributed data storage system.

SUMMARY

According to an embodiment of the present invention, a method for performing data deduplication for an eventually consistent distributed data storage system includes receiving data content from one or more clients by a distributed data storage system, wherein the one or more clients do not coordinate transmitting of the data content. The method also includes calculating a hash for the data content by the distributed data storage system, writing the data content to an object used for data deduplication, wherein a name of the object is based on the hash and determining whether the data content is present in the distributed data storage system based on the name of an object previously stored on the distributed data storage system. The method further includes keeping track of a number of references to the data content and delaying deletion of the data content for a predetermined period of time.

According to another embodiment of the present invention, a system includes a processor in communication with one or more types of memory, the processor configured to perform a method that includes receiving data content from one or more clients by a distributed data storage system, wherein the one or more clients do not coordinate transmitting of the data content. The method also includes calculating a hash for the data content by the distributed data storage system, writing the data content to an object used for data deduplication, wherein a name of the object is based on the hash and determining whether the data content is present in the distributed data storage system based on the name of an object previously stored on the distributed data storage system. The method further includes keeping track of a number of references to the data content and delaying deletion of the data content for a predetermined period of time.

According to yet another embodiment of the present invention, a computer program product for performing data deduplication for an eventually consistent distributed data storage system includes a non-transitory storage medium readable by a processing circuit and storing instructions for execution by the processing circuit for performing a method that includes receiving data content from one or more clients by a distributed data storage system, wherein the one or more clients do not coordinate transmitting of the data content. The method also includes calculating a hash for the data content by the distributed data storage system, writing the data content to an object used for data deduplication, wherein a name of the object is based on the hash and determining whether the data content is present in the distributed data storage system based on the name of an object previously stored on the distributed data storage system. The method further includes keeping track of a number of references to the data content and delaying deletion of the data content for a predetermined period of time.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
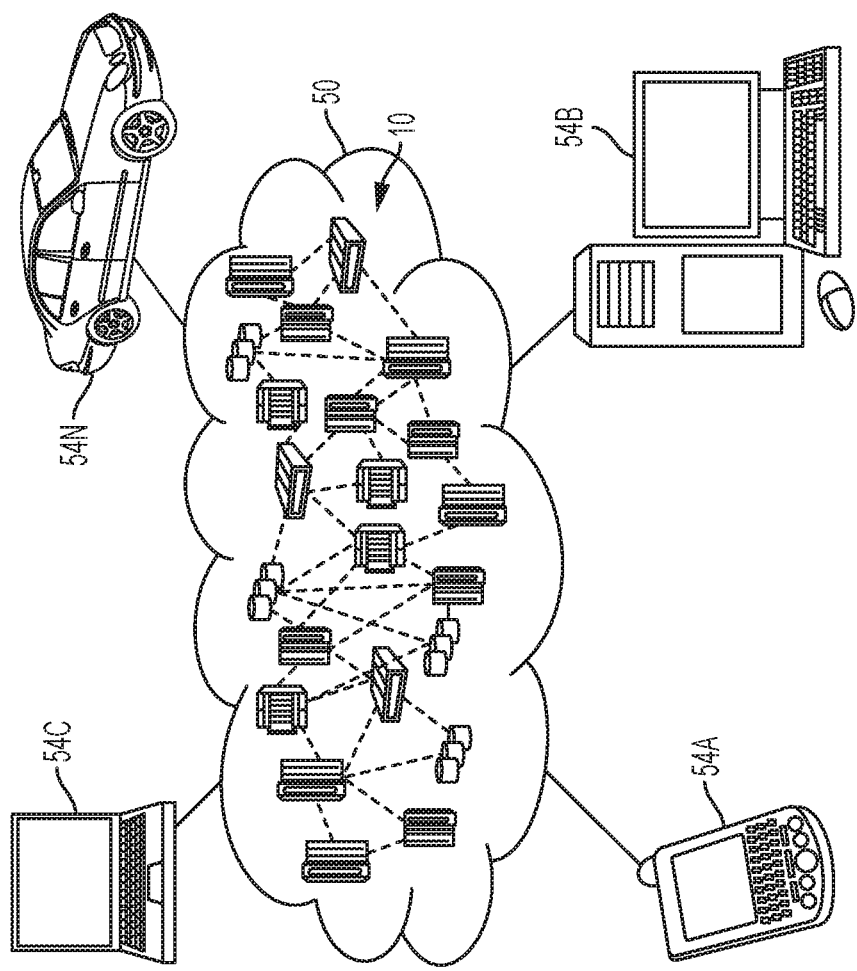
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
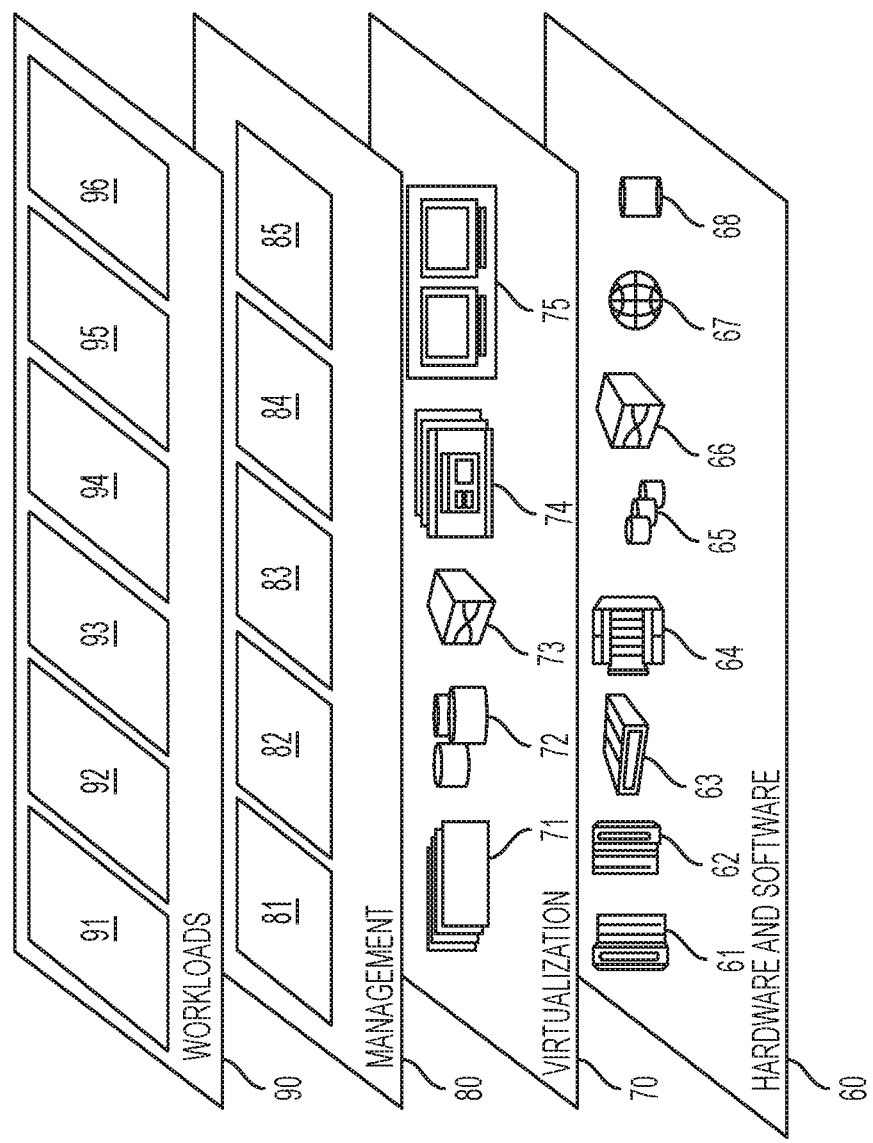
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for the safe deletion of deduplicated data within an eventually consistent distributed data storage system that utilizes a data deduplication method while also allowing for the avoidance of sending data content "over-the-wire" into the system when that data content already exists in the distributed data storage system.

Figure 3:
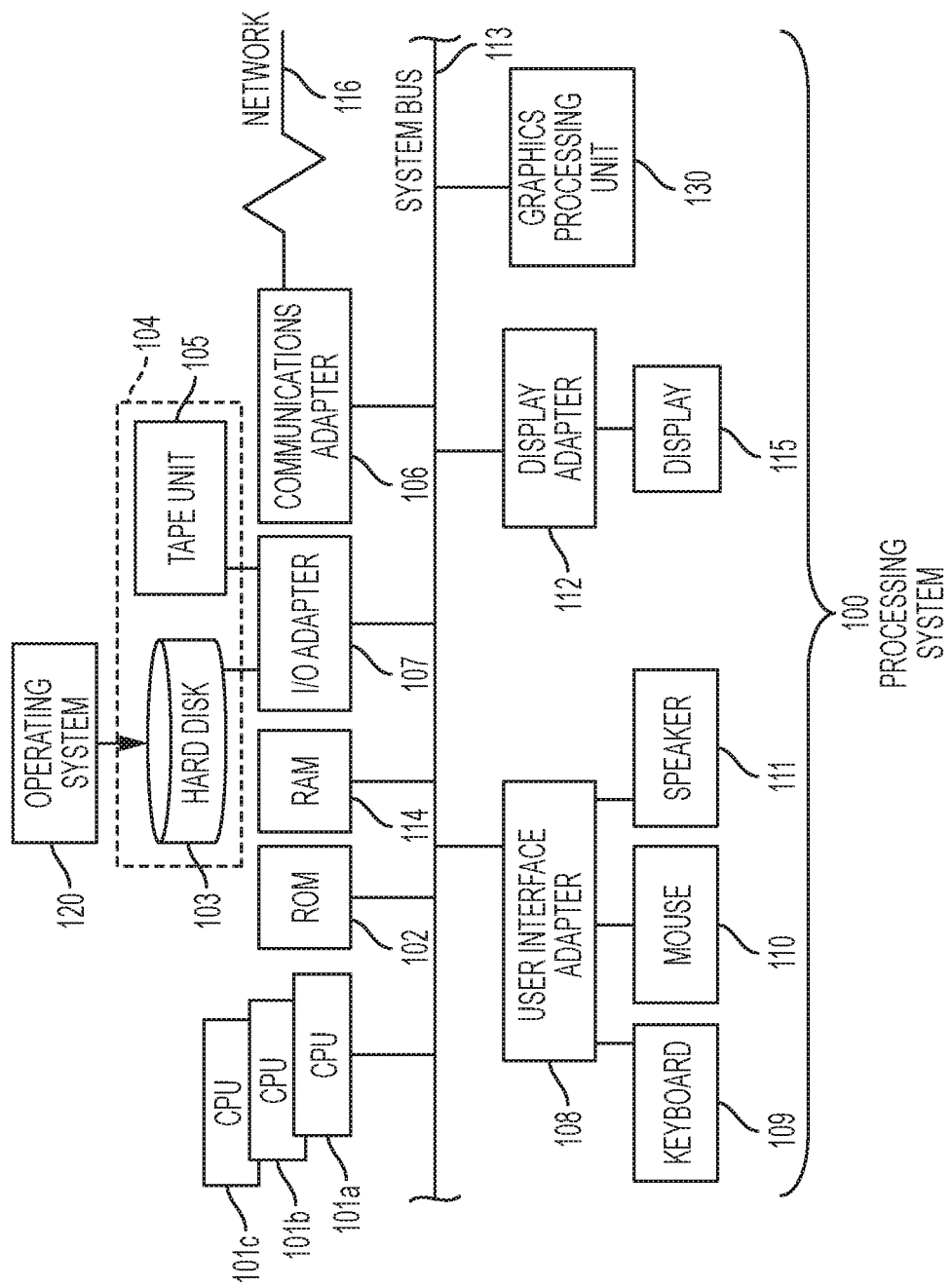
FIG. 3 is a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 5:
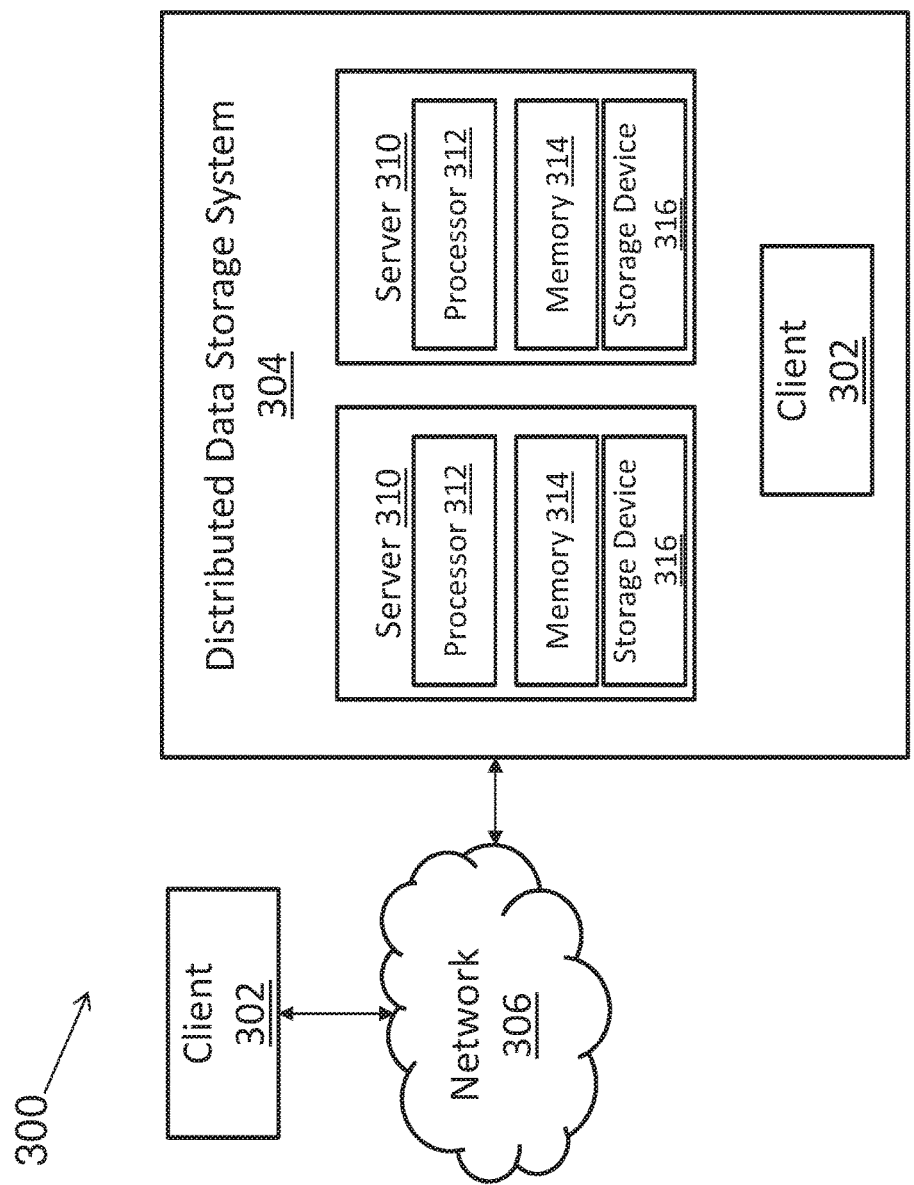
FIG. 5 is a block diagram of a distributed data storage system in accordance with an embodiment of the present invention.

Referring now to FIG. 5, a block diagram of an exemplary system 300 is shown. As illustrated the system 300 includes multiple clients 302 that are in communication with a distributed data storage system 304 via a network 306. The network 306 may include a public network such as the Internet, a private network, or a combination thereof. In exemplary embodiments, the distributed data storage system 304 includes a plurality of servers 310. Each of the servers 310 are in communication with one another and each of the servers 310 include a processor 312, a memory 314 and a storage device 316. The storage device 316 may include a plurality of storage devices such as hard disk drives, solid state drives, or the like.

In exemplary embodiments, the client 302 of the distributed storage system 304 may be an applications running on a server 310 in the same (cloud) data center, or outside of the data center. In exemplary embodiments, the client(s) 302 may be embodied in a processing system such as the one shown and described with reference to FIG. 3. The clients 302 can also be laptops, pcs, phones, tablets, etc. running outside of the (cloud) data center.

In accordance with embodiments of the present invention, methods, systems, and computer program products are disclosed for the safe deletion of deduplicated data within an eventually consistent distributed data storage system that utilizes a data deduplication method. The deduplicated data is safely deleted, as described in more detail hereinafter, when it is no longer referenced by any of the clients of the system. Other embodiments of the disclosure utilize a data deduplication method that allows the clients of the system to avoid sending the data "over-the-wire" (i.e., from one location to another) when they write objects whose content is already stored in the distributed data storage system.

In the known related art of data deduplication, one approach is content addressable data storage in which each stored data object is named by the hash of its content. Typically a client uploads the data object and the distributed data storage system returns the name of the data object created to the client. This name is typically based on the hash of the content of the data object, such that all equivalent content has the same name. Deletion is not possible, without strong consistency and serialization of the nodes in a distributed system, because the system cannot know for certain when no client remains that still may need the data. Also, to avoid sending data content that is already stored in the system, a client first calculates the hash of the data content and the sends the hash to check if the data content is already in the system. If the data content is there, it does not need to be sent. If the data content is not there, then it is sent.

Figure 4:
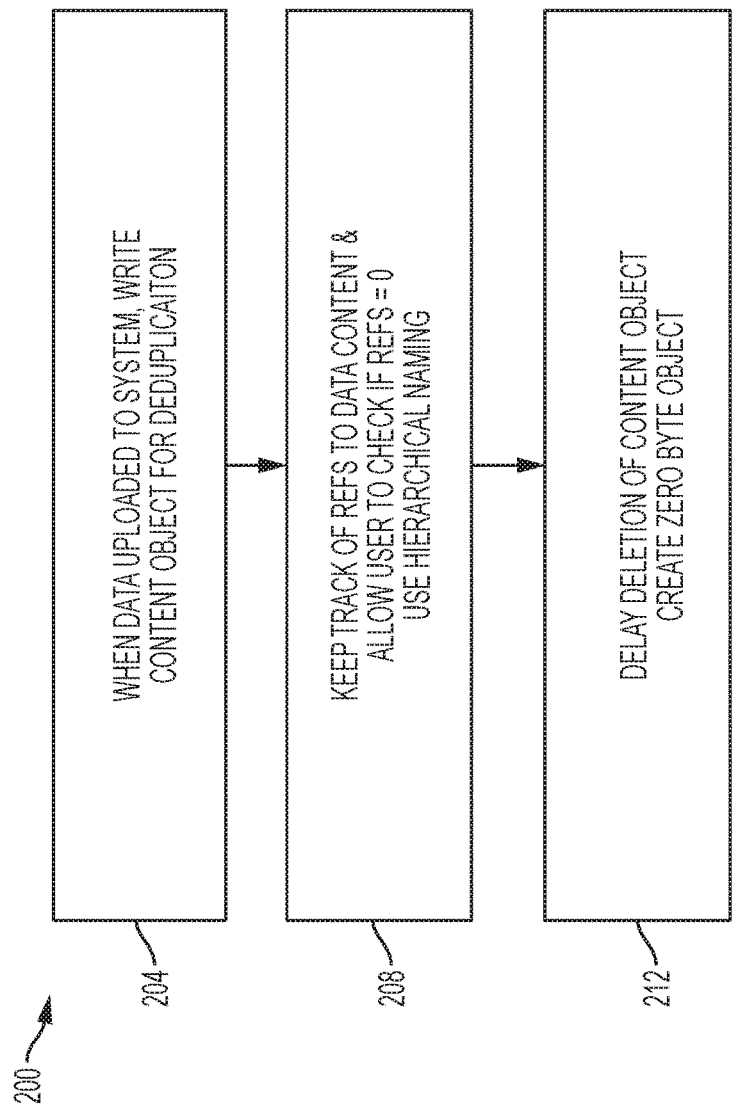
FIG. 4 is a flow diagram of a method that avoids sending data content over-the-wire that is already stored in the distributed data storage system and also allows for the safe deletion of deduplicated data from the system, in accordance with an embodiment of the present invention.

With reference now to FIG. 4, there illustrated is a flow diagram of an embodiment of a method 200 that avoids sending data content over-the-wire that is already stored in the distributed data storage system and also allows for the safe deletion of deduplicated data from the system.

When a client accesses an eventually consistent distributed data storage system, that particular client may not see the same order of operations as other clients. Furthermore, each individual operation may be atomic (i.e., instantaneous), but there is usually no way to put together multiple operations atomically. Thus, with reference to the method 200 of FIG. 4, to implement data deduplication with a delete function and to also avoid writing data content to the system when that content is already in the system, the following problems are solved by embodiments of the present invention (in no particular specific order):

The execution of a request for a first client, Client A, may check if a particular data content is already in the distributed data storage system. Assuming the data content is in the system, a new data object may be created which references that existing data content. However, meanwhile Client B has deleted that data content. This problem may be solved by embodiments of the present invention by eliminating the check by the execution of the request for a client (here, Client A) for the existence of a particular data content within the system. As such, when data content is uploaded to the distributed data storage system in a step 204, the system may also always write the content object used for deduplication. This holds true because since the operation is idempotent, the content object is always the same.

Also, a step 208 keeps track of the references to a particular data object's content and allows an execution for a client's request to check if the number of references has reached zero. For this, the hierarchical naming available in object store systems such as OpenStack Swift and S3 may be used. For example, assume "hash" is text derived from the content hash of a data object. Then the content object can be stored with the name "hash" and references to the data object can be zero byte objects with the name "hash/reference/objectname."

Further, when an execution of client request perceives that the last reference to a piece of data content has been deleted (e.g., no more zero byte objects with "hash/reference" in the prefix of their name), the request execution cannot delete the content object, since the request execution cannot know for sure that there has not been an intervening upload of that particular data content to the system by another client.

This problem can be solved by delaying the deletion of the content object in a step 212 for a predetermined period of time until it is certain that all intervening operations have been completed and that the number of references is still zero. In particular, the execution of a delete request may create a zero byte object called "hash/locked" (e.g., a "lock object") and queue the content object for deletion by an asynchronous delete process that runs relatively much later in time after all operations have been completed. While the lock object is set, no new deduplication can occur for the content object for requests by other clients. Thus, for the period of time until the asynchronous delete process runs, a window of time exists in which data deduplication does not occur for this particular piece of data content. In addition, when the lock object is set, the next request execution to see it may create a new copy of the data content, if desired.

Furthermore, in embodiments of the present invention, to enable over-the-wire data deduplication, some of the software protocol may be run at the client side and some on the server side, in particular the calculation of the hash may occur on the client side and be sent to the server side where the remainder of the protocol executes. Furthermore, WSGI middleware may be used to run the server side of the protocol, e.g., for OpenStack Swift.

In an exemplary embodiment of the present invention, a generation scheme is used such that each time the reference count goes down to zero, the next attempt to deduplicate data with the same content will start a generation of a new version of the content object. Each generation has its own copy of the content object. This may lead to multiple copies of the content object, one for each active generation. However, deduplication for a particular content object will never be suspended (i.e., deduplication is always running).

Assume that each data object's content is named by the hash of its content. The name provided by the client for an object is "objectname." For each content object, there is a pseudo-directory (we call it a pseudo-directory because there is not really a directory, rather it is part of a hierarchical name) named "hash," where "hash/reference/objectname" is a zero byte object created for each reference to a content object. And "hash/locked" is a zero byte object created for during the execution of a delete operation when it perceives that there are no remaining references for a content object.

On the client side there may be a function that calculates the hash and sends it over the wire. On the server side there may be a piece of middleware that receives the hash and checks if it is already in the system.

To allow data deduplication to occur all of the time, even during a waiting period for the asynchronous delete process to run, the aforementioned generation scheme is utilized. Each generation has its' own copy of the content object and its own set of references to its content object. When the number of references in a generation goes down to zero, the locked object is created for that generation and the generation number is increased by one.

The protocols for implementing the embodiments of the present invention may be split or divided into two parts—one part that runs on the client's side and another part that runs on the server side. These protocols may be implemented in any suitable programming language in light of the teachings herein.

The asynchronous delete process mentioned above is typically a process that runs in the background. That delete process "wakes up" when enough time has passed such that the store of data is eventually consistent with respect to a particular content object—for example twelve hours after the delete occurred. Also, locks from prior generations may be deleted.

Embodiments of the present invention solution avoid races, using the aforementioned techniques such as avoiding the existence check (e.g., when content is uploaded then always write the content object used for deduplication). This operation is idempotent, i.e., has no additional effect if executed multiple times. Also, keeping track of the references to a content object can be done with the hierarchical naming available in object store systems such as OpenStack Swift and S3. Further, delayed deletion is utilized in which when the execution for a client request notices the reference count to content is zero, it creates a lock object. Other clients stop deduplicating with this copy of the content. Its deletion is delayed to avoid the race with another request execution that did not see the lock in time. Also, generations are utilized such that when a lock is set, the next request execution to see it creates a new copy of the content.

Embodiments of the present invention also allow clients to read, write and delete data without any coordination between them. Also, in eventually consistent systems, users or clients may not see the same order of operations. The embodiments leverage a unique combination of idempotent operations (operations that can be repeated without additional effect), delayed deletion, generations and hierarchical naming. Also, embodiments of present invention can save significant storage capacity for applications and services making use of eventually consistent data stores and services such as object stores and cloud object store services.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a data content from one or more clients by a distributed data storage system, wherein the one or more clients do not coordinate transmitting of the data content;
   calculating a hash for the data content by the distributed data storage system;
   writing the data content to an object used for data deduplication, wherein a name of the object is based on the hash;

determining whether the data content is present in the distributed data storage system based on the name of an object previously stored on the distributed data storage system;

keeping track of a number of references to the data content; and deleting the data content when all concurrent operations within the distributed data storage system have been completed and when the number of references to the data content of a particular data content is zero, wherein deleting the data content comprises creating an indicator object and queuing the data content for deletion by an asynchronous delete process at a later point in time.

2. The method of claim 1 wherein receiving the data content by the distributed data storage system and writing the data content used for data deduplication comprises writing a content object that is always the same.

3. The method of claim 1 wherein keeping track of the number of references to the data content comprises using hierarchical naming wherein the hash is part of the name.

4. The method of claim 1 wherein when the indicator object exists, no new deduplication can occur for the data content and creation of a new copy of the data content is allowed.

5. The method of claim 1 wherein keeping track of the number of references to the data content object comprises generating a new version of the data content object when the number of references to a first data content object is zero.

6. The method of claim 1 wherein the hash is calculated by the one or more clients and transmitted to the distributed data storage system.

7. A system comprising:
a processor in communication with one or more types of memory, the processor configured to:
receive a data content from one or more clients by a distributed data storage system, wherein the one or more clients do not coordinate transmitting of the data content;
calculate a hash for the data content by the distributed data storage system;
write the data content to an object used for data deduplication, wherein a name of the object is based on the hash;
determine whether the data content is present in the distributed data storage system based on the name of an object previously stored on the distributed data storage system;
keep track of a number of references to the data content; and
delete the data content when all concurrent operations within the distributed data storage system have been completed and when the number of references to the data content of a particular data content is zero, wherein the processor configured to delete the data content comprises the processor configured to create an indicator object and queue the data content for deletion by an asynchronous delete process at a later point in time.

8. The system of claim 7 wherein receiving the data content by the distributed data storage system and writing the data content used for data deduplication comprises writing a content object that is always the same.

9. The system of claim 7 wherein keeping track of the number of references to the data content comprises using hierarchical naming wherein the hash is part of the name.

10. The system of claim 7 wherein when the indicator object exists, no new deduplication can occur for the data content and creation of a new copy of the data content is allowed.

11. A computer program product comprising:
a non-transitory storage medium readable by a processing circuit and storing instructions for execution by the processing circuit for performing a method comprising:
receiving a data content from one or more clients by a distributed data storage system, wherein the one or more clients do not coordinate transmitting of the data content;
calculating a hash for the data content by the distributed data storage system;
writing the data content to an object used for data deduplication, wherein a name of the object is based on the hash;
determining whether the data content is present in the distributed data storage system based on the name of an object previously stored on the distributed data storage system;
keeping track of a number of references to the data content; and
deleting the data content when all concurrent operations within the distributed data storage system have been completed and when the number of references to the data content of a particular data content is zero, wherein deleting the data content comprises creating an indicator object and queuing the data content for deletion by an asynchronous delete process at a later point in time.

12. The computer program product of claim 11 wherein receiving the data content by the distributed data storage system and writing the data content used for data deduplication comprises writing a content object that is always the same.

13. The computer program product of claim 11 wherein keeping track of the number of references to the data content comprises using hierarchical naming wherein the hash is part of the name.

14. The computer program product of claim 11 wherein when the indicator object exists, no new deduplication can occur for the data content and creation of a new copy of the data content is allowed.

* * * * *